(12) United States Patent
Takahashi et al.

(10) Patent No.: US 8,102,914 B2
(45) Date of Patent: Jan. 24, 2012

(54) IMAGE DECODER

(75) Inventors: Masaru Takahashi, Hayama (JP); Keisuke Inata, Ebina (JP)

(73) Assignee: Hitachi, Ltd., Tokyo (JP)

( * ) Notice: Subject to any disclaimer, the term of this patent is extended or adjusted under 35 U.S.C. 154(b) by 973 days.

(21) Appl. No.: 12/055,626

(22) Filed: Mar. 26, 2008

(65) Prior Publication Data

US 2009/0003450 A1    Jan. 1, 2009

(30) Foreign Application Priority Data

Jun. 26, 2007   (JP) ................................. 2007-167738

(51) Int. Cl.
     *H04N 11/02*      (2006.01)
(52) U.S. Cl. ................................................... 375/240.12
(58) Field of Classification Search ........................ None
     See application file for complete search history.

(56) References Cited

U.S. PATENT DOCUMENTS

| 6,262,773 | B1 * | 7/2001 | Westerman ..................... 348/448 |
| 2005/0078213 | A1 * | 4/2005 | Sumiyoshi et al. ............ 348/441 |
| 2006/0023788 | A1 * | 2/2006 | Otsuka et al. ............ 375/240.16 |
| 2006/0109907 | A1 * | 5/2006 | Sato et al. ................ 375/240.16 |
| 2007/0046811 | A1 * | 3/2007 | Kimura et al. ................ 348/448 |
| 2007/0092007 | A1 * | 4/2007 | Ho ............................ 375/240.16 |
| 2011/0164681 | A1 * | 7/2011 | Nakagawa et al. ...... 375/240.16 |

FOREIGN PATENT DOCUMENTS

| JP | 11-266440 | 9/1999 |
| JP | 2001-86508 | 3/2001 |
| JP | 2004-336817 | 11/2004 |
| JP | 2006-352912 | 12/2006 |

\* cited by examiner

*Primary Examiner* — Chirag Shah
*Assistant Examiner* — Amar Persaud
(74) *Attorney, Agent, or Firm* — Antonelli, Terry, Stout & Kraus, LLP.

(57) ABSTRACT

The present invention provides an image decoder which decodes a stream encoded with standard resolution and transforms it into a high-definition image with a better image quality. An intra-field pixel interpolation module generates an interpolated pixel using pixels in a field. An inter-field pixel interpolation module generates an interpolated pixel using pixels from another field. A weighted averaging module refers to the prediction mode used in predictive encoding for the coded stream. If the prediction mode is a field prediction mode, it increases the mixture ratio of interpolated pixels generated by the intra-field pixel interpolation module, and if the prediction mode is a frame prediction mode, increases the mixture ratio of interpolated pixels generated by the inter-field pixel interpolation module.

2 Claims, 6 Drawing Sheets

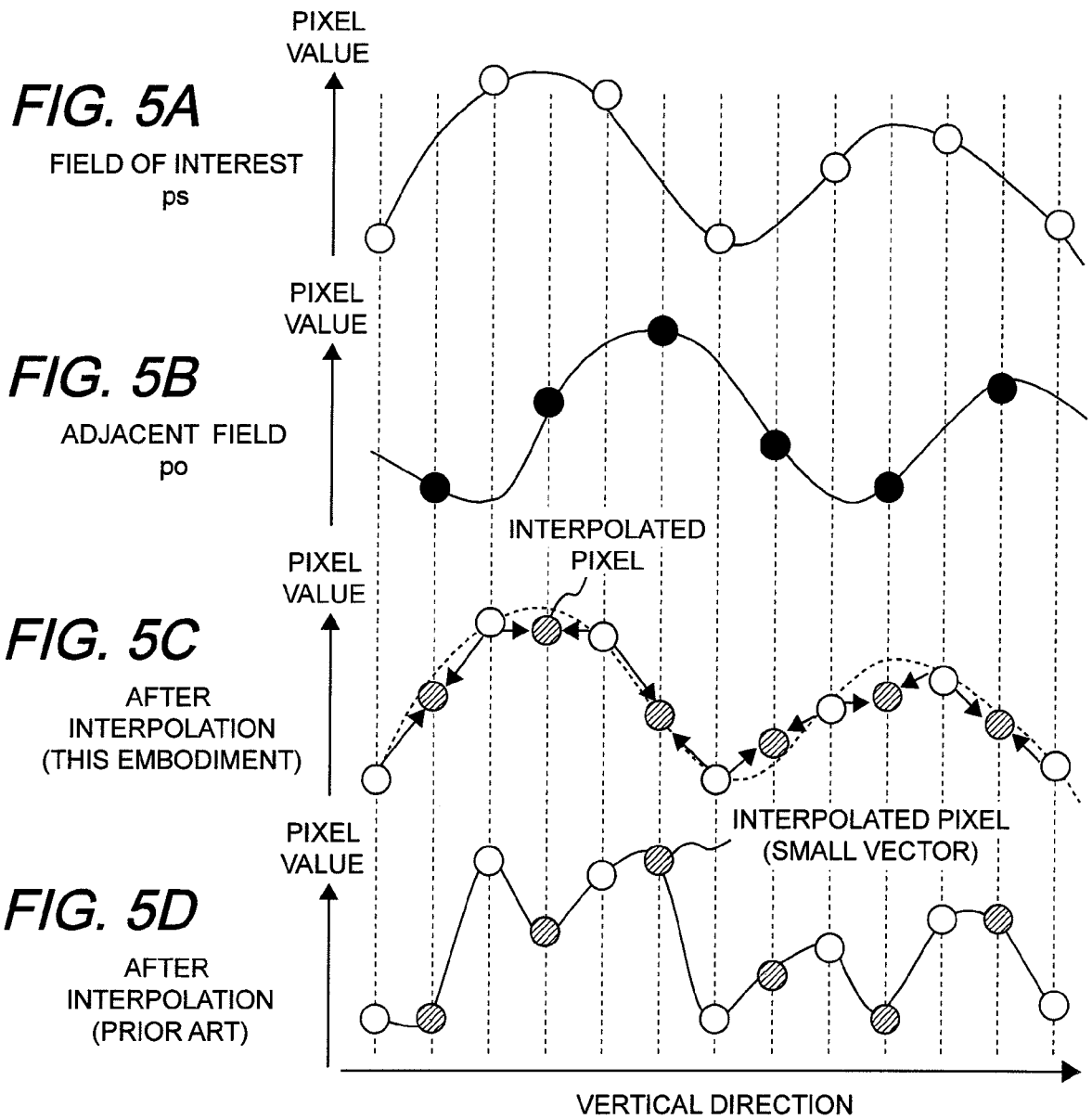

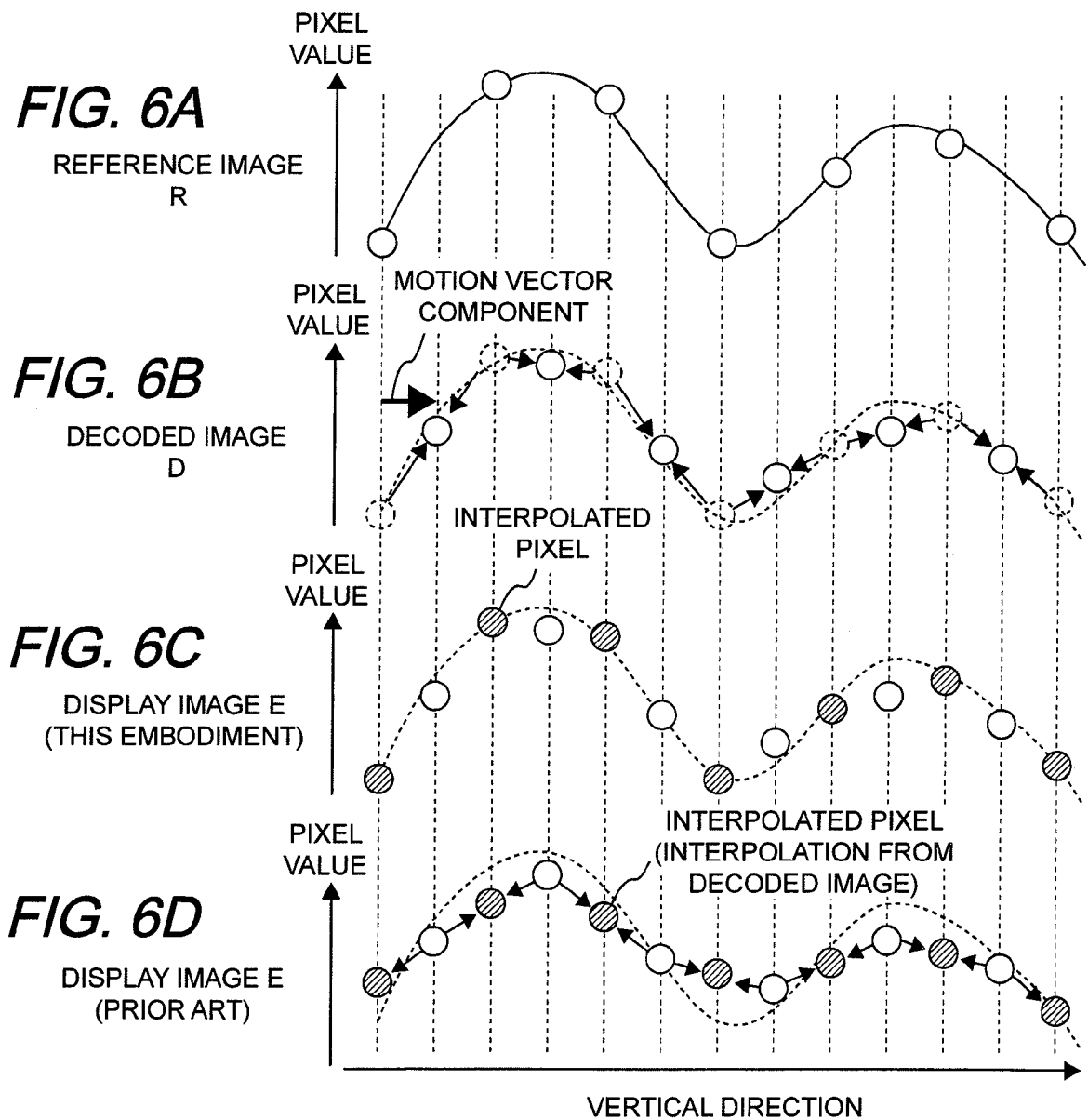

IMAGE DECODER

CLAIM OF PRIORITY

The present application claims priority from Japanese application serial no. JP 2007-167738, filed on Jun. 26, 2007, the content of which is hereby incorporated by reference into this application.

BACKGROUND OF THE INVENTION

The present invention relates to an image decoder which decodes a coded stream and an image transformation circuit which transforms an interlaced image into a progressive image in the decoding process.

For a stream encoded with standard resolution such as digital broadcast or DVD images to be decoded for audiovisual display on a high-definition TV monitor, it is necessary to convert the resolution (from interlaced images into progressive images) to improve the image quality. In the conventional progressive conversion method, interpolation scanning line signals generated by intra-field processing and interpolation scanning line signals generated by inter-field processing are combined according to image motion information to create interpolation scanning line signals.

In relation to the above method, JP-A-11-266440 describes a technique in which for an image signal series in an interlace scan, the mixture ratio of moving image interpolation scanning line signals generated by intra-field signal processing and still image interpolation scanning line signals generated by inter-field signal processing varies depending on the scalar amount of per-pixel motion vector to generate signals of scanning lines which are skipped in the interlace scan.

JP-A-2001-86508 discloses a technique in which an evaluation value is determined using a decoded motion vector and according to the evaluation value, intra-field interpolation signals and motion compensating interpolation signals are combined at a given mixture ratio and the combined signals are merged with decoded images before interpolation to output the resulting images.

JP-A-2004-336817 describes a technique in which motion compensating interpolation signals and moving image compensating signals are combined at the mixture ratio of motion compensation interpolation signals and intra-field interpolation signals which varies according to the absolute value of a motion compensation inter-frame differential signal, in order to generate interpolation scanning lines, where if the absolute value of the motion compensating inter-frame differential signal is below a threshold, motion compensation interpolation signals are generated by decoded motion vectors and if it is equal to or above the threshold, motion compensation interpolation signals are generated by zero motion vectors, and the moving image compensation signals are generated by intra-field signal processing.

SUMMARY OF THE INVENTION

The techniques described in the above patent documents intend to reduce transformation processing by progressive transformation using motion vectors. The mixture ratio of intra-field interpolation signals and inter-field interpolation signals is controlled according to the magnitude of a motion vector or motion compensation inter-frame differential signal. However, the magnitude of a motion vector or motion compensation differential signal is not always an index which shows which is stronger between the intra-field inter-pixel correlation and the inter-field inter-pixel correlation. This means that the optimum mixture ratio may not be selected.

Besides, in the above techniques, interpolation signals are generated using only decoded pixels generated from predicted pixels interpolated by motion compensation. These predicted pixels involve resolution deterioration due to decimal vector motion compensation. Hence, these conventional techniques have a problem that the resolution cannot be improved because interpolation signals are generated using only decoded pixels.

An object of the present invention is to provide a technique which achieves a higher image quality in the process of generating a high-definition image by decoding a stream encoded with standard resolution.

According to one aspect of the invention, an image decoder includes: an entropy code decoding module which extracts an orthogonal transformation coefficient and prediction information from a coded stream for each pixel block; an inverse orthogonal transformation module which restores a difference image by inverse transformation with respect to the orthogonal transformation coefficient for each pixel block; a decoded image generating module which generates a predicted image by motion-compensating a reference image according to the prediction information and combines it with the difference image to generate a decoded image; an image transformation module which generates interpolated pixels for the difference image and the reference image by mixing intra-field interpolation, which uses pixels in a field, and inter-field interpolation, which uses pixels from another field, and creates a display image as a high-resolution image; a reference image memory which stores the decoded image as the reference image; and a display image memory which stores the display image. The image transformation module refers to the prediction mode used in motion compensation inter-frame predictive encoding for the coded stream. If the prediction mode for a pixel block including positions of the interpolated pixels is a field prediction mode, it increases the mixture ratio of interpolated pixels generated by intra-field interpolation and if the prediction mode is a frame prediction mode, increases the mixture ratio of interpolated pixels generated by inter-field interpolation.

According to another aspect of the invention, an image transformation circuit includes: an intra-field pixel interpolation module which generates an interpolated pixel using pixels in a field; an inter-field pixel interpolation module which generates an interpolated pixel using pixels from another field; and a weighted averaging module which mixes interpolated pixels generated by the intra-field pixel interpolation module and interpolated pixels generated by the inter-field pixel interpolation module at a prescribed ratio. The weighted averaging module refers to the prediction mode used in motion compensation inter-frame predictive encoding for the coded stream and if the prediction mode for an image block including positions of the interpolated pixels is a field prediction mode, increases the mixture ratio of interpolated pixels generated by the intra-field pixel interpolation module, and if the prediction mode is a frame prediction mode, increases the mixture ratio of interpolated pixels generated by the inter-field pixel interpolation module.

According to a further aspect of the invention, in an image transformation circuit, a coded stream is a stream obtained by encoding motion vectors by motion compensation inter-frame predictive encoding with a decimal pixel accuracy, and an image interpolation module to generate interpolated pixels using reference image data before motion compensation is provided.

According to the present invention, the accuracy in the mixture ratio between intra-field interpolation and inter-field interpolation can be increased so that image quality is enhanced in transformation into a high-resolution image. In addition, the influence of resolution deterioration due to motion compensation in the case of decimal motion vectors can be avoided, leading to a better image quality.

BRIEF DESCRIPTION OF THE DRAWINGS

These and other features, objects and advantages of the present invention will become more apparent from the following description when taken in conjunction with the accompanying drawings, wherein:

FIGS. 5A to 5D show an example of comparison between this embodiment and the prior art in pixel values obtained by interpolation, in which FIG. 5A shows pixel values of pixels in a field of interest, FIG. 5B shows ones in an adjacent field, FIG. 5C shows a result of interpolation in this embodiment and FIG. 5D shows a result of interpolation in the prior art; and FIGS. 6A to 6D show an example of comparison between this embodiment and the prior art in display images obtained by interpolation, in which FIG. 6A shows pixel values of a reference image, FIG. 6B shows those of a predicted image, FIG. 6C shows those of a display image in this embodiment, and FIG. 6D shows those of a display image in the prior art.

DETAILED DESCRIPTION OF PREFERRED EMBODIMENTS

Next, a preferred embodiment of the present invention will be described referring to the accompanying drawings.

Figure 1:
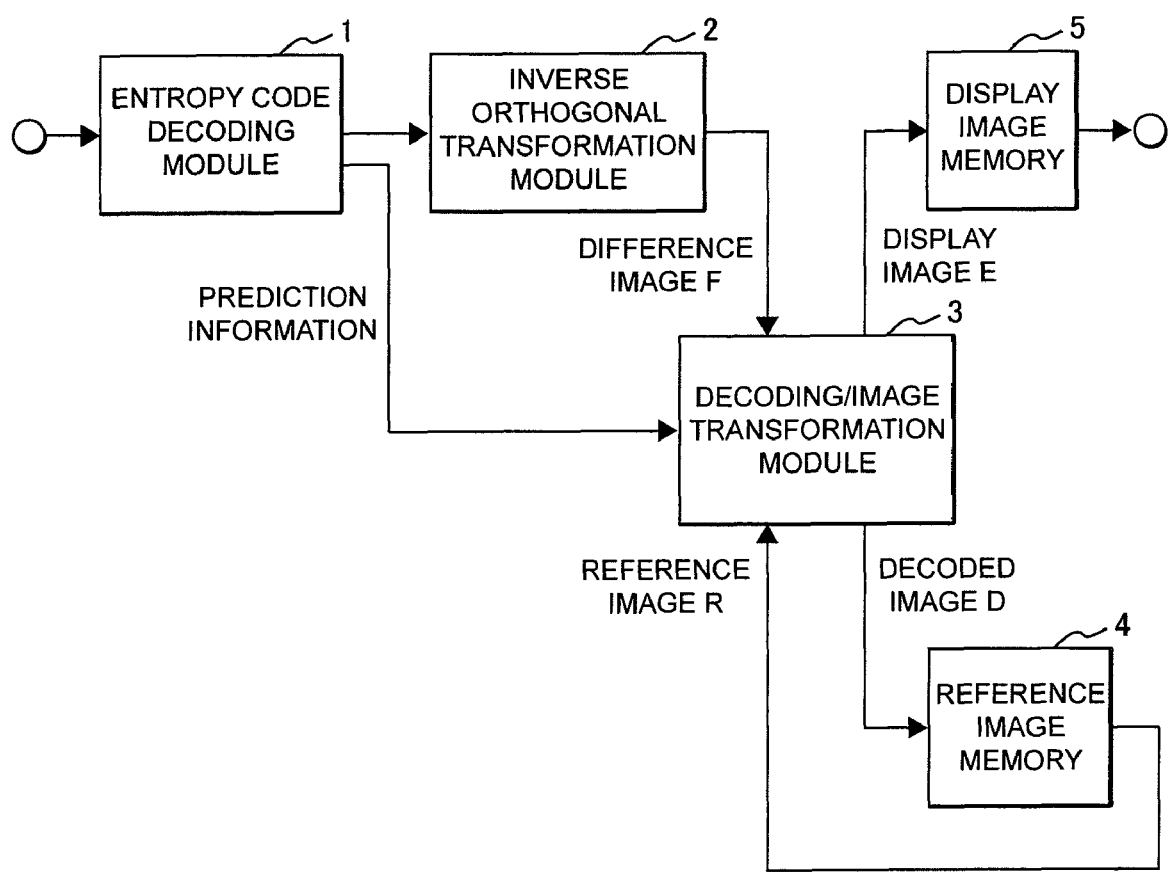
FIG. 1 shows the configuration of an image decoder with an image transformation function according to an embodiment of the present invention.

FIG. 1 shows the configuration of an image decoder with an image transformation function according to an embodiment of the present invention. An entropy code decoding module 1 receives a stream encoded (interlaced) with standard resolution such as digital broadcast signals or DVD signals. The incoming stream is encoded by a motion compensation interframe predictive encoding method and an orthogonal transformation coefficient and prediction information are extracted from the stream for each pixel block. An inverse orthogonal transformation module 2 restores a difference image F by inverse transformation with respect to the orthogonal transformation coefficient for each pixel block.

A decoding/image transformation module 3 reads a reference image R from a reference image memory 4 and generates a predicted image by motion compensation according to the prediction information and combines it with the difference image F from the inverse orthogonal transformation module 2 to generate a decoded image D and stores it in the reference image memory 4 as a decoded interlaced image. At the same time, the decoding/image transformation module 3 creates a display image E as a high-resolution progressive image by pixel interpolation which mixes intra-field and inter-field interpolation processes, and stores it a display image memory 5. The display image E stored in the display image memory 5 is outputted to a display unit (not shown) such as a high-definition TV monitor. The decoding/image transformation module 3 has a decoded image generating function and a resolution conversion function as described above.

Figure 2:
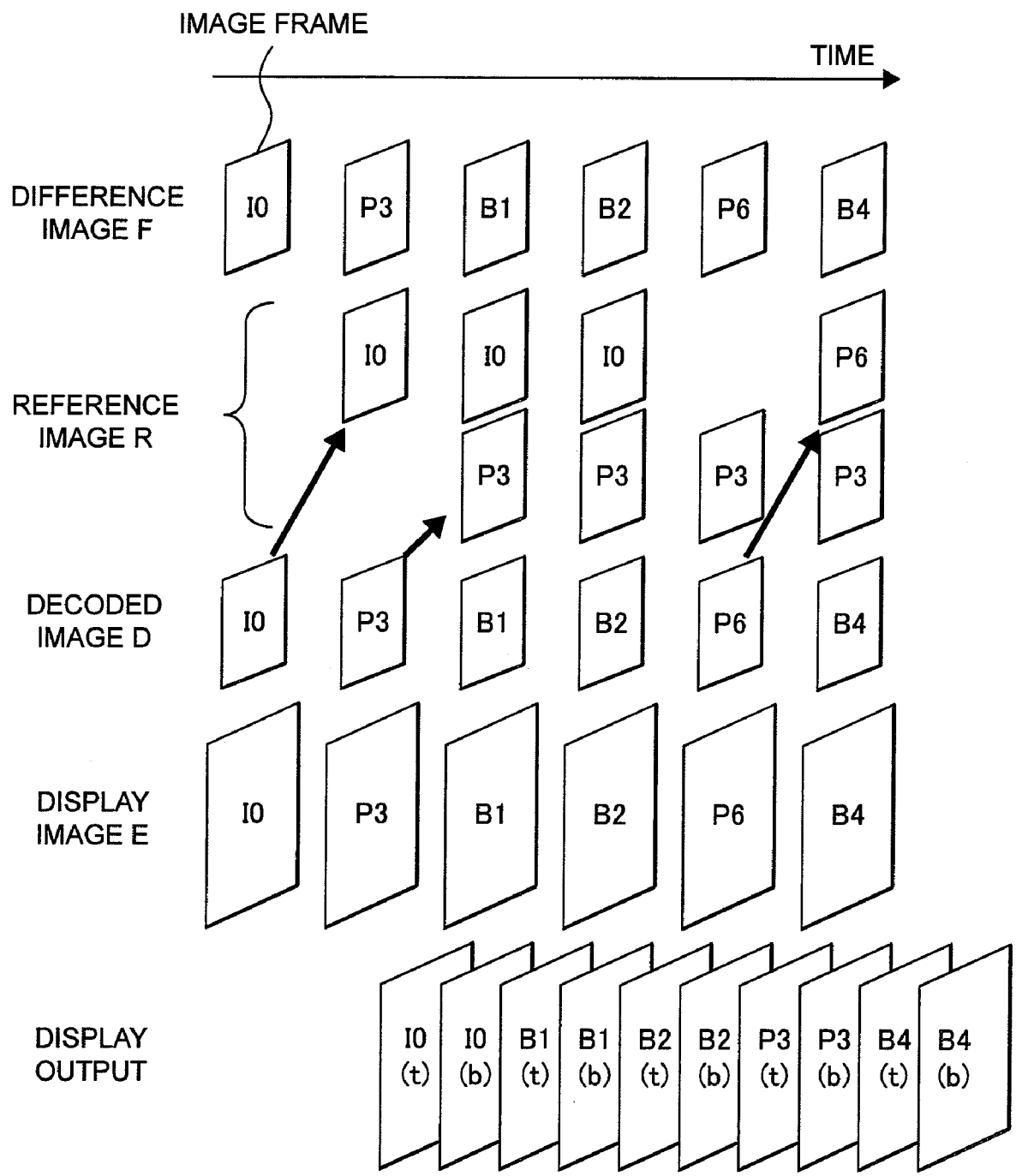
FIG. 2 is a timing chart showing the decoding process for each image frame.

FIG. 2 is a timing chart showing the decoding process for each image frame in the decoder according to this embodiment. In FIG. 2, image frames are shown in the order of input and regarding the frame symbols shown here, I denotes an intra-coded picture or I picture, P a predictive-coded picture or P picture or, and B a bidirectionally coded picture or B picture and the numbers which follow these symbols represent the order in which the frames are displayed.

First, the entropy code decoding module 1 receives coded data for I picture I0. It analyzes the received data (stream) and outputs an orthogonal transformation coefficient and prediction information. The inverse orthogonal transformation module 2 restores a difference image F by inverse transformation with respect to the orthogonal transformation coefficient. In the case of an MPEG2 I picture, the inversely transformed image is a decoded image D. The decoding/image transformation module 3 writes the decoded image D in the reference image memory 4. At the same time, it creates a high-definition display image E by pixel interpolation (an enlarged frame in FIG. 2) and writes it in the display image memory 5.

Next, as P3 is received, in the same way as above a difference image F is generated and the I0 image data, the preceding I (or P) picture, is read as a reference image R from the reference image memory 4. In FIG. 2, an arrow indicates that the decoded image D (I0 in this case) in the reference image memory 4 is used as the reference image R. The decoding/image transformation module 3 generates a predicted image by motion compensation of the reference image R according to prediction information and adds it to the difference image F to generate a decoded image D and writes it in the reference image memory 4. At the same time, a high-definition display image E is created and written in the display image memory 5.

Next, as B1 is received, in the same way as above a difference image F is generated and the I0 and P3 image data is read as a reference image R from the reference image memory 4. Again the decoding/image transformation module 3 creates a predicted image by motion compensation of the reference image R according to prediction information and adds it to the difference image F to generate a decoded image D. At the same time, a high-definition display image E is created and written in the display image memory 5. In the MPEG2 mode, reference is not made to any B picture and the decoded images D of B pictures are not written in the reference image memory 4.

Next, B2 is received and processed in the same way as for B1. Then as P6 is received, it is processed in the same way as for P3 using P3, the preceding P (or I) picture, as a reference image R. After that, similar processes are repeated for I pictures, P pictures and B pictures.

As an example of image transformation, the decoding/image transformation module 3 increases the image size of the difference image F, reference image R and decoded image D (horizontal 720 pixels×vertical 480 pixels) to the image size of the display image E (horizontal 1920 pixels×vertical 1080 pixels) (resolution conversion). For final display output, display images E are read from the display image memory 5 and outputted progressively in the order in which they should be displayed, as shown in FIG. 2. Specifically top fields (t) and bottom fields (b) are outputted alternately.

Figure 3:
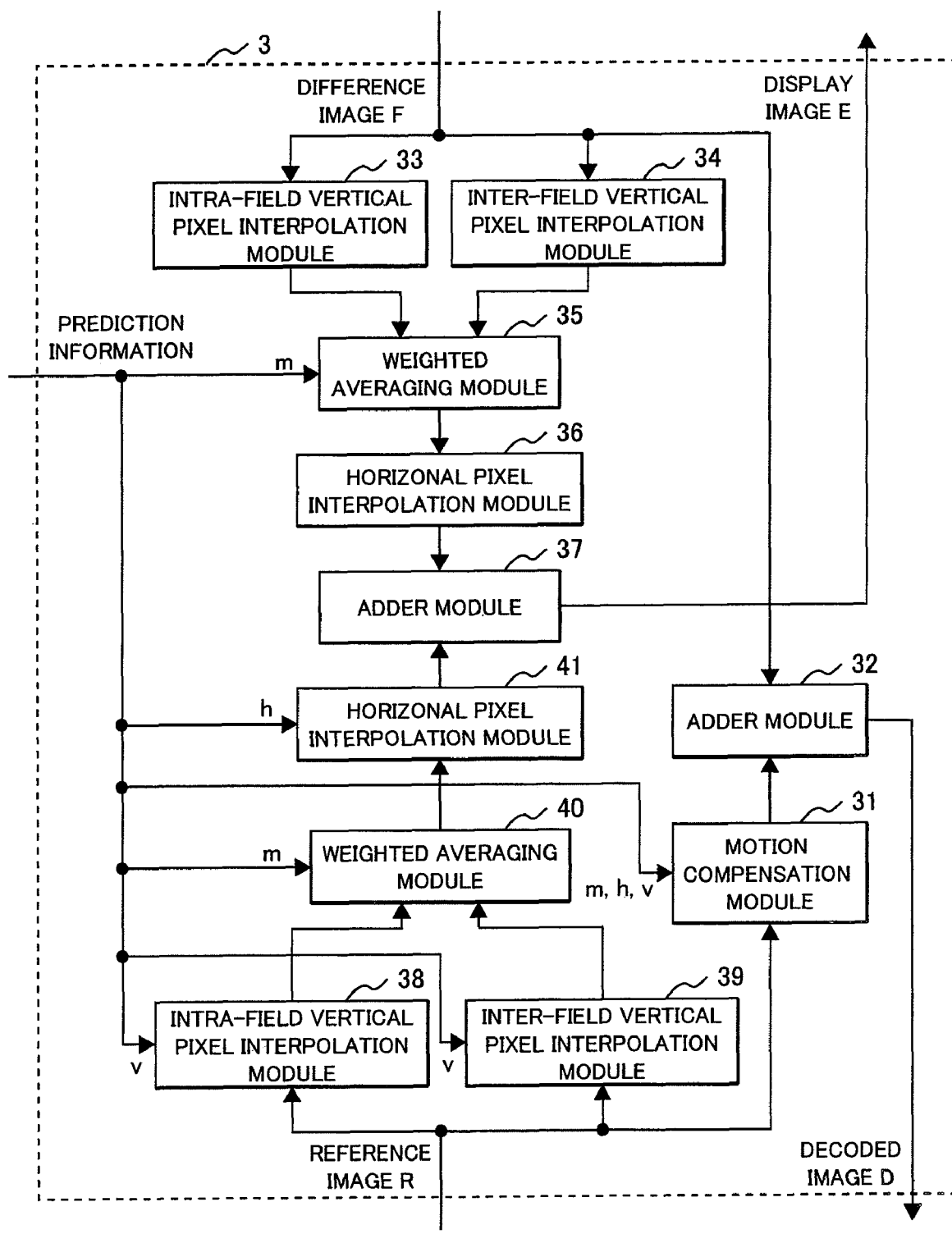
FIG. 3 is a detailed block diagram of a decoding/image transformation module (image transformation circuit)

FIG. 3 is a detailed block diagram of the decoding/image transformation module (image transformation circuit) 3.

First, a block which generates a decoded image D without resolution conversion includes: a motion compensation module 31 which generates a predicted image from a reference image R using prediction information; and an adder module 32 which combines a predicted image and a difference image F to generate a decoded image D. The motion compensation module 31 generates a predicted image from a reference image R through a standardized process, using prediction mode m, motion vector horizontal component h and motion vector vertical component v which are included in the prediction information. The adder module 32 adds a difference image F to the predicted image to generate a decoded image D.

For creation of a resolution-converted display image E, the circuit also includes an image transformation block for difference images F and one for reference images R.

The image transformation block for difference images F includes: an intra-field vertical pixel interpolation module 33 which performs pixel interpolation of a difference image F using pixels in a field and enlarges the image vertically; an inter-field vertical pixel interpolation module 34 which performs pixel interpolation of a difference image F using pixels from another field and enlarges the image vertically; a weighted averaging module 35 which performs weighted averaging of interpolated pixels generated by the intra-field vertical pixel interpolation module 33 and those by the inter-field vertical pixel interpolation module 34 according to prediction information (prediction mode m) to generate interpolated pixels and creates a difference image F enlarged vertically; and a horizontal pixel interpolation module 36 which performs horizontal pixel interpolation and scaling on the difference image F enlarged vertically to create a difference image F enlarged vertically and horizontally.

The image transformation block for reference images R includes: an intra-field vertical pixel interpolation module 38 which generates interpolated pixels shifted vertically according to prediction information (v) from a reference image R and also performs pixel interpolation using pixels in a field and enlarges the image vertically; an inter-field vertical pixel interpolation module 39 which generates interpolated pixels shifted vertically according to prediction information (v) and also performs pixel interpolation using pixels from another field and enlarges the image vertically; a weighted averaging module 40 which performs weighted averaging of interpolated pixels generated by the intra-field vertical pixel interpolation module 38 and those by the inter-field vertical pixel interpolation module 39 according to prediction information (prediction mode m) to generate interpolated pixels and creates a predicted image enlarged vertically; and a horizontal pixel interpolation module 41 which generates interpolated pixels shifted horizontally according to prediction information (h) for the predicted image enlarged vertically and also performs horizontal pixel interpolation and scaling on the image to create a predicted image enlarged vertically and horizontally.

In addition, for creation of a display image E, the circuit includes an adder module 37 which combines the difference image F enlarged vertically and horizontally by the horizontal pixel interpolation module 36 and the predicted image enlarged vertically and horizontally by the horizontal pixel interpolation module 41 to create a display image E enlarged vertically and horizontally.

Next, the image transformation process which is carried out by the decoding/image transformation module 3 will be explained.

Figure 4:
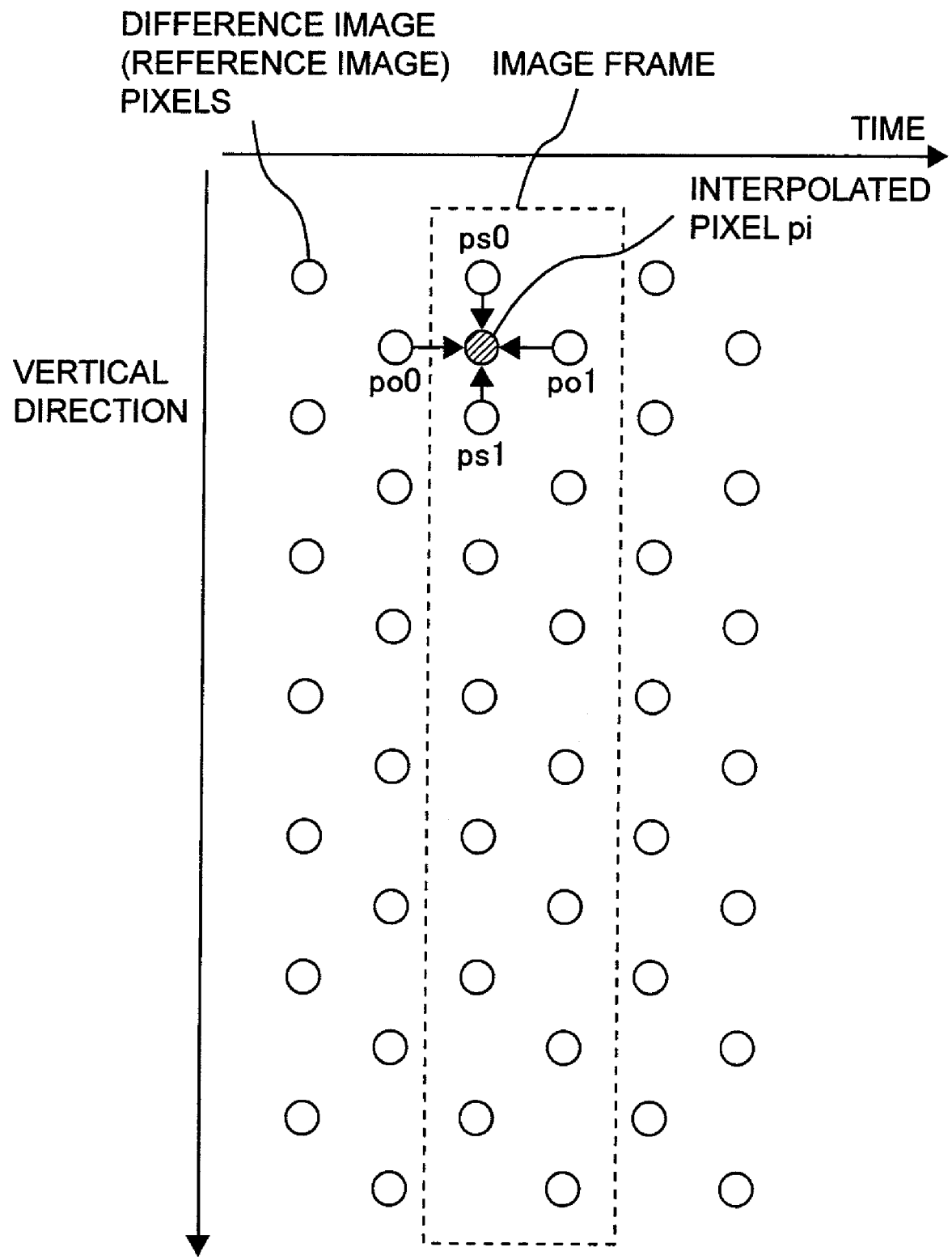
FIG. 4 illustrates interpolation done on a difference image F.

FIG. 4 illustrates interpolation (progressive transformation) which is done on a difference image F by the vertical pixel interpolation modules 33 and 34. The figure schematically shows spatial and temporal pixel positions in an interlaced image where an interpolated pixel pi is generated for progressive transformation. The intra-field vertical pixel interpolation module 33 generates pixel data for the position of an interpolated pixel pi from vertically adjacent pixels ps0 and ps1. On the other hand, the inter-field vertical pixel interpolation module 34 generates pixel data for the position of the interpolated pixel pi from adjacent pixels po0 and po1 in the time axis direction.

The weighted averaging module 35 mixes the two sets of pixel data generated by the pixel interpolation modules 33 and 34 by weighted averaging to make data for the interpolated pixel pi. Here the weight (mixture ratio) in weighted averaging is determined according to the prediction mode m (field prediction or frame prediction) of a macro block which includes the interpolated pixel pi. Specifically, in the "field prediction" mode, since the correlation of adjacent image data between fields is less significant and it is thus more efficient to make a prediction on a field-by-field basis, the weight of pixel data generated by the intra-field vertical pixel interpolation module 33 is larger and the weight of pixel data generated by the inter-field vertical pixel interpolation module 34 is smaller (or zero). Contrariwise, in the "frame prediction" mode, since the correlation between fields is significant, the weight of pixel data generated by the inter-field vertical pixel interpolation module 34 is larger and the weight of pixel data generated by the intra-field vertical pixel interpolation module 33 is smaller (or zero).

In the case of FIG. 4, pixels po0 and po1, which are in the same vertical position, are used for inter-field vertical pixel interpolation. However, in the case of a temporally moving image, interpolation data accuracy is improved by using pixels vertically shifted by the amount of motion for interpolation.

After progressive transformation, the horizontal pixel interpolation module 36 performs horizontal pixel interpolation and when necessary, horizontal and/or vertical scaling. For example, in order to transform 720 pixels×480 lines into 1920 pixels×1080 lines, 540 lines for the top field may be produced from 480 lines obtained by progressive transformation of 240 lines in the top field.

Next, interpolation (progressive transformation) which is done on a reference image R by the vertical pixel interpolation modules 38 and 39 will be explained. The procedure is basically the same as that for the difference image F which has been explained above in reference to FIG. 4 except that a motion compensation process is added. Therefore, interpolated pixels which are shifted vertically according to the motion vector vertical component v included in the prediction information are generated. Like the average weighting module 35, the average weighting module 40 determines the weight in weighted averaging depending on whether the prediction mode m is either "field prediction" or "frame prediction." Then, the horizontal pixel interpolation module 41 performs horizontal pixel interpolation and horizontal and/or vertical scaling.

In the horizontal pixel interpolation module 41, since motion compensation is needed, interpolated pixels which are shifted horizontally depending on the motion vector horizontal component h included in the prediction information are generated. Lastly the adder module 37 adds them to the pixel-interpolated difference image to make a display image E.

Next, the effect of this embodiment will be described.

One outstanding feature of this embodiment is to use the prediction mode m for control of weighted averaging between intra-field vertical pixel interpolation and inter-field vertical pixel interpolation. This brings about an effect of image quality improvement. In the prior art, the weight in weighted averaging between intra-field vertical pixel interpolation and inter-field vertical pixel interpolation is controlled depending on motion vector magnitude. In this case, in image compression a motion vector does not always coincide with the amount of image motion, since the amount of discrepancy from pixel data with minimum prediction errors is generally detected. In other words, if a high coincidence pattern with a small motion vector is found in spite of a large image motion, a small vector may be selected as a motion vector.

FIGS. 5A to 5D show an example of comparison between this embodiment and the prior art in pixel values obtained by interpolation. FIG. 5A shows pixel values of pixels ps in a field of interest and FIG. 5B shows pixel values of pixels po in a temporally adjacent field. In this case, image motion is large and the correlation between pixels ps in a field and pixels po in a neighboring field which constitutes the same frame is small and "field prediction" is selected as the prediction mode m for encoding.

FIG. 5C shows a result of interpolation in this embodiment where when the "field prediction" mode is selected, larger weight is given to interpolation based on pixel data generated by the intra-field vertical pixel interpolation modules 33 and 38, namely ps, and thus pixel data after interpolation is smooth and continuous. On the other hand, FIG. 5D shows a result of interpolation in the prior art where when a small vector is selected as a motion vector, even if the correlation between fields is small, larger weight is given to interpolation based on po, causing image quality deterioration due to pixel data disorder. Therefore, according to this embodiment, the use of prediction mode m improves the accuracy in the mixture ratio between intra-field interpolation and inter-field interpolation and thereby enhances image quality.

Another outstanding feature of this embodiment is that pixel interpolation is done on a reference image for the purpose of obtaining an enlarged display image. This also helps enhance image quality. For comparison, in the prior art, for an enlarged display image, pixel interpolation is done not on a reference image but on a decoded image. Specifically the prior art does not use processing modules for the reference image R, such as the vertical pixel interpolation modules 38 and 39 and the horizontal pixel interpolation module 41 as shown in FIG. 3; instead, the decoded image D from the adder module 32 is processed in the prior art.

FIGS. 6A to 6D show an example of comparison between this embodiment and the prior art in display images obtained by interpolation. For simple illustration, it is assumed that the difference image F is zero, namely the decoded image D is equal to the predicted image. FIGS. 6A to 6D show half-pel (0.5 pixel) positions as an example of decimal pixels for motion vector components. FIG. 6A shows an example of pixel values of the reference image R. FIG. 6B shows an example of pixel values of a predicted image (decoded image D) where the predicted image is generated by 1:1 linear half-pel interpolation and treated as a decoded image D as it is. In this case, the weight position in interpolation is shifted according to the motion vector decimal component.

FIG. 6C shows pixel values of a display image obtained according to this embodiment and shows that interpolated pixels are generated for the predicted image (decoded image D in FIG. 6B) using the reference image R data (shown in FIG. 6A) before half-pel interpolation. As a consequence, the interpolated display image E is a fine reproduction of the original image and at the same time has a better resolution. On the other hand, FIG. 6D shows pixel values of a display image in the prior art where the display image E is created by interpolation of the decoded image D (FIG. 6B) and thus the discrepancy of the pixel values of the interpolated pixels from those of the original image is considerable, resulting in resolution deterioration. Here the case of 1:2 interpolation is shown. Although the use of a multi-tap filter improves the resolution to a certain extent, pixel value information has been lost upon generation of half-pels and cannot be restored completely.

According to this embodiment, interpolated pixels are generated from the reference image R before motion compensation so that resolution deterioration due to motion compensation by decimal vectors including half-pels does not occur and thus image quality is enhanced.

Image transformation according to this embodiment can be widely used to display standard resolution contents such as digital broadcast and DVD image signals on a high-definition monitor.

While we have shown and described several embodiments in accordance with our invention, it should be understood that disclosed embodiments are susceptible to changes and modifications without departing from the scope of the invention. Therefore, we do not intend to be bound by the details shown and described herein but intend to cover all such changes and modifications that fall within the ambit of the appended claims.

In the above embodiments each elements at least expressed as "module" can be realized by a hardware or a software or both to achieve the function and the operation explained in the part.

What is claimed is:

1. An image decoder which decodes a coded stream and transforms a decoded image into a high resolution image through interpolated pixels, comprising:
    an entropy code decoding module which extracts an orthogonal transformation coefficient and prediction information from the coded stream for each pixel block;
    an inverse orthogonal transformation module which restores a difference image by inverse transformation with respect to the orthogonal transformation coefficient for each pixel block;
    a decoded image generating module which generates a predicted image by motion-compensating a reference image according to the prediction information and combines it with the difference image to generate a decoded image;
    an image transformation module which generates interpolated pixels for the difference image and the reference image by mixing intra-field interpolation, which uses pixels in a field, and inter-field interpolation, which uses pixels from another field, and creates a display image as a high-resolution image;
    a reference image memory which stores the decoded image as the reference image; and
    a display image memory which stores the display image;
    wherein the image transformation module refers to prediction mode extracted from said prediction information used in motion compensation inter-frame predictive encoding for the coded stream and if the prediction mode for a pixel block including positions of the interpolated pixels is a field prediction mode, increases the mixture ratio of interpolated pixels generated by only the intra-field interpolation and if the prediction mode is a frame prediction mode, increases the mixture ratio of interpolated pixels generated by only the inter-field interpolation.

2. An image transformation circuit which transforms a decoded image from a coded stream into a high resolution image through interpolated pixels, comprising:

an intra-field pixel interpolation module which generates an interpolated pixel using pixels in a field;

an inter-field pixel interpolation module which generates an interpolated pixel using pixels from another field; and a weighted averaging module which mixes interpolated pixels generated by the intra-field pixel interpolation module and interpolated pixels generated by the inter-field pixel interpolation module at a prescribed ratio;

wherein the weighted averaging module refers to prediction mode extracted from prediction information used in motion compensation inter-frame predictive encoding for the coded stream and if prediction mode for an image block including positions of the interpolated pixels is a field prediction mode, increases the mixture ratio of interpolated pixels generated by only the intra-field pixel interpolation module, and if the prediction mode is a frame prediction mode, increases the mixture ratio of interpolated pixels generated by only the inter-field pixel interpolation module.

* * * * *